(12) United States Patent
Mehra et al.

(10) Patent No.: US 11,579,650 B2
(45) Date of Patent: Feb. 14, 2023

(54) METHOD AND APPARATUS FOR SYNCHRONIZING THE TIME STAMP COUNTER

(71) Applicant: Advanced Micro Devices, Inc., Santa Clara, CA (US)

(72) Inventors: Amitabh Mehra, Fort Collins, CO (US); David M. Dahle, Fort Collins, CO (US); Richard M. Born, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/721,886

(22) Filed: Dec. 19, 2019

(65) Prior Publication Data

US 2021/0191454 A1 Jun. 24, 2021

(51) Int. Cl.
*G06F 1/12* (2006.01)
(52) U.S. Cl.
CPC ..................... *G06F 1/12* (2013.01)
(58) Field of Classification Search
CPC ... G06F 1/32; G06F 9/44; G06F 21/57; G06F 1/12
See application file for complete search history.

(56) References Cited

U.S. PATENT DOCUMENTS

| | | | |
|---|---|---|---|
| 2004/0049706 A1* | 3/2004 | Strong | G06F 1/14 713/400 |
| 2004/0221208 A1 | 11/2004 | Floyd et al. | |
| 2006/0130059 A1 | 6/2006 | Bennett et al. | |
| 2009/0222683 A1 | 9/2009 | Serebrin et al. | |
| 2011/0154090 A1* | 6/2011 | Dixon | G06F 1/14 713/502 |
| 2014/0189265 A1* | 7/2014 | Kitchin | G06F 1/12 711/155 |
| 2016/0085263 A1* | 3/2016 | Kuzi | G06F 1/14 713/400 |
| 2020/0220636 A1* | 7/2020 | Rabinovich | G06F 9/545 |

FOREIGN PATENT DOCUMENTS

EP 1 358 538 B1 8/2010
KR 10-2008-0112420 A 12/2008

* cited by examiner

*Primary Examiner* — Keshab R Pandey
(74) *Attorney, Agent, or Firm* — Volpe Koenig

(57) ABSTRACT

A method and apparatus for synchronizing a time stamp counter (TSC) associated with a processor core in a computer system includes initializing the TSC associated with the processor core by synchronizing the TSC associated with the processor core with at least one other TSC in a hierarchy of TSCs. One or more processor cores are powered down. Upon powering up of the one or more processor cores, the TSC associated with the processor core is synchronized with the at least one other TSC in the hierarchy of TSCs.

21 Claims, 3 Drawing Sheets

METHOD AND APPARATUS FOR SYNCHRONIZING THE TIME STAMP COUNTER

BACKGROUND

One of the large challenges in a multicore processor system is keeping the Time Stamp Counter (TSC) synchronized across all the different cores potentially running at different frequencies. As the distances become large between cores and even sockets, this becomes an increasingly difficult problem. Another challenge is keeping the TSC synchronized during power management events, like CC1, CC6, or other sleep states. In conventional designs, the per-core logic has to be reprogrammed with the new TSC value when it wakes up from a clock halt or sleep state.

BRIEF DESCRIPTION OF THE DRAWINGS

A more detailed understanding can be had from the following description, given by way of example in conjunction with the accompanying drawings wherein.

DETAILED DESCRIPTION

Figure 1:
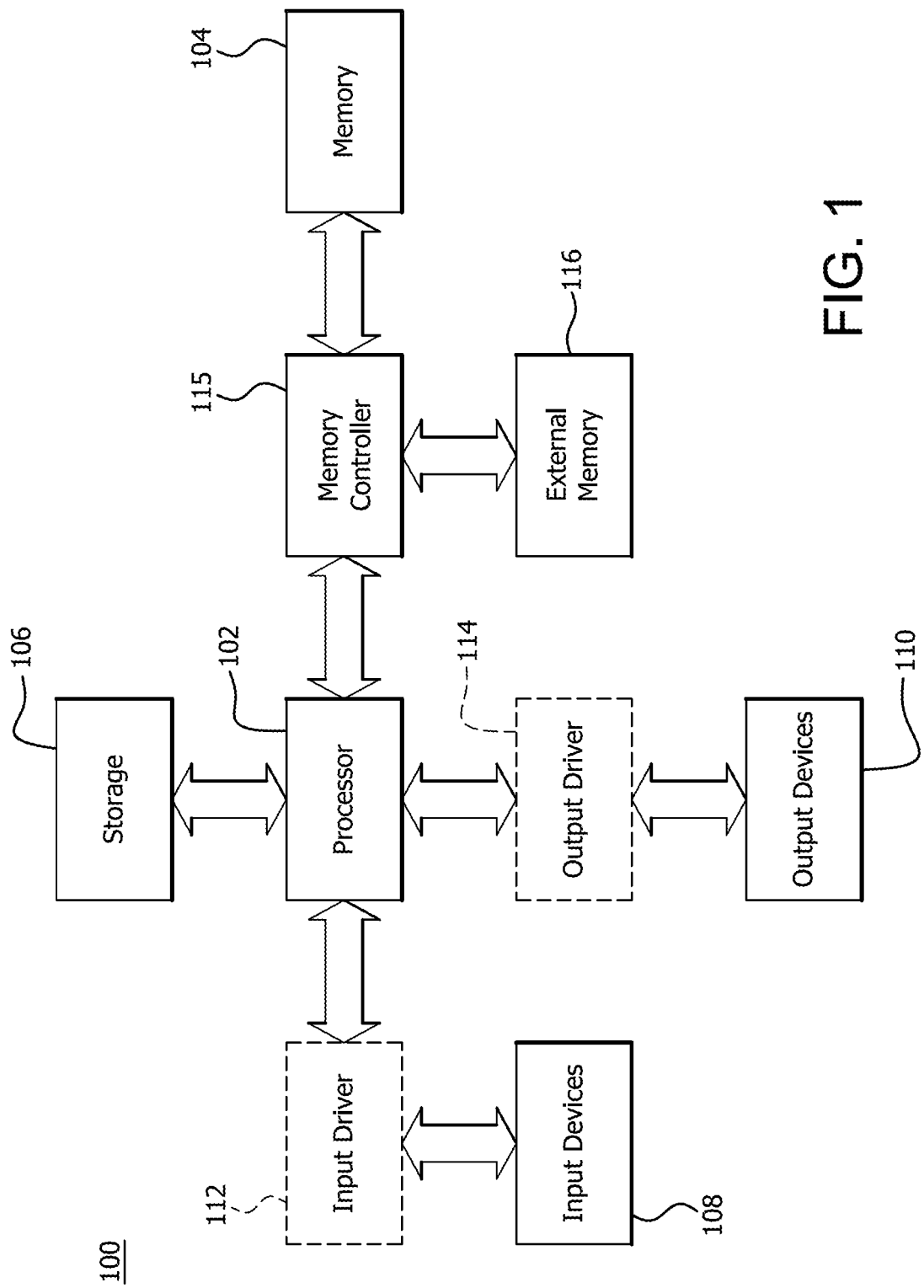
FIG. 1 is a block diagram of an example device in which one or more features of the disclosure can be implemented.

Although the method and apparatus will be expanded upon in further detail below, a brief description for the Time Stamp Counter (TSC) and the use of synchronization as an important aspect of computer systems is included here. In computer systems, it is sometimes useful to make use of the concept of a Global Timestamp (GT). A GT is a constantly incrementing value that is common to all processor threads that can be used to indicate global event completion order. This GT can be used by separate processor threads to coordinate activity and indicate correct order. This mechanism is commonly used in distributed database systems to determine whether to continue to process a multi-step transaction or whether the multi-step transaction needs to be re-scheduled due to a change in one of the dependent transactions that was scheduled with a newer GT than the GT of the transaction that is attempting to complete. There exist software mechanisms that could be used to implement a global timestamp counter (GTC) but these typically involve semaphore transactions to a shared variable and tends to be very slow due to the communication overhead and collision resolution of many processes attempting to update a single shared location. Instead, processors have implemented a time stamp counter (TSC) that is local to each physical processor so that accesses are quick and that it is kept in sync with all other TSCs so that globally all processes will see the same value at roughly the same time period, avoiding the overhead for maintaining the software GTC. For this mechanism to be utilized, all the local TSCs must be in sync with one another at all times regardless of power management events.

A method for synchronizing a time stamp counter (TSC) associated with a processor core in a computer system includes initializing the TSC associated with the processor core by synchronizing the TSC associated with the processor core with at least one other TSC in a hierarchy of TSCs. One or more processor cores are powered down. Upon powering up of the one or more processor cores, the TSC associated with the processor core is synchronized with the at least one other TSC in the hierarchy of TSCs.

An apparatus for synchronizing Time Stamp Counters (TSCs) in a computer system includes a processor die including a plurality of processor cores, a first TSC associated with a processor core of the plurality of processor cores, and a second TSC in a hierarchy of TSCs that is in communication with the first TSC. The first TSC is initialized by synchronizing the first TSC with the second TSC. Upon powering up of the one or more processor cores after a powerdown, the first TSC associated with the processor core is synchronized with the second TSC in the hierarchy of TSCs.

A non-transitory computer-readable medium for synchronizing a Time Stamp Counter (TSC) associated with a processor core in a computer system has instructions recorded thereon, that when executed by the processor, cause the processor to perform operations. The operations include initializing the TSC associated with the processor core by synchronizing the TSC associated with the processor core with at least one other TSC in an hierarchy of TSCs, powering down one or more processor cores, and upon powering up of the one or more processor cores, synchronizing the TSC associated with the processor core with the at least one other TSC in the hierarchy of TSCs.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
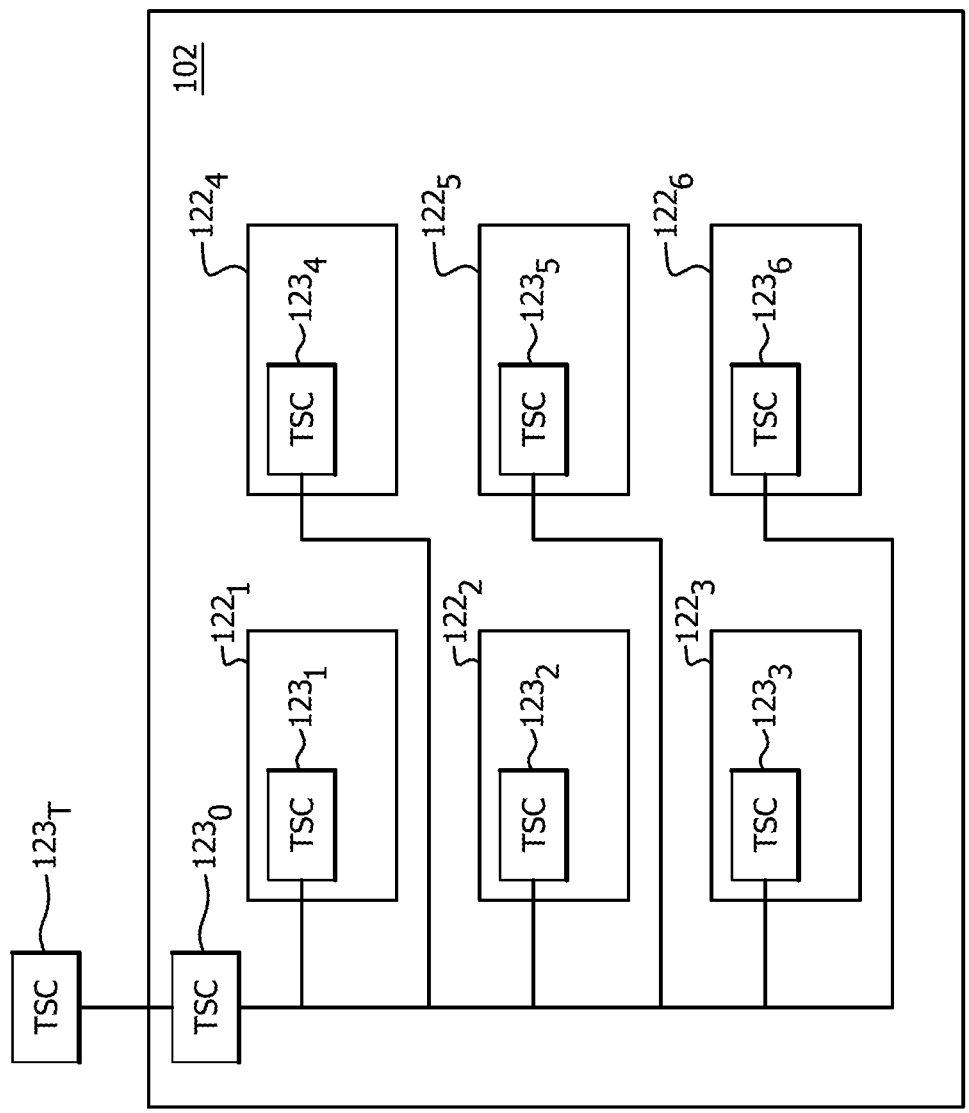
FIG. 2 is a schematic diagram of an example processor including a plurality of cores.

FIG. 2 is a schematic diagram of an example processor including a plurality of cores. In the example shown in FIG. 2, processor 102 of device 100 is depicted as having a plurality of cores 122 (designated $122_1$, $122_2$, $122_3$, $122_4$, $122_5$, and $122_6$). The processor 102 includes a TSC $123_0$, which is part of a hierarchy of TSCs 123 and in communication with a master TSC $123_T$. Further, each core 122 includes a TSC 123, respectively (designated $123_1$, $123_2$, $123_3$, $123_4$, $123_5$, and $123_6$). As mentioned above, each TSC 123 is kept in sync with all other TSCs.

The "Allow TSC Updates" and "Add TSC Offset" steps described herein are depicted as occurring in an order; however, the steps can be done in either order. Both need to be completed before it is indicated that the TSC has been synchronized. In some embodiments, one order is utilized, and in other embodiments, a different order is utilized. The choice in order may depend on the logic for communicating the "TSC Offset". When the physical distance that the "TSC Offset" needs to be transmitted is small, it is transferred on dedicated wires and therefore the offset is added after the TSC updates have begun. When the physical distance that the "TSC Offset" needs to be transmitted is large, the "TSC Offset" can make use of the "TSC Update" signal and be serially transmitted to the TSC. In this case, TSC updates are held off a sufficient number of TSC cycles to allow the "TSC Offset" to be transmitted before the first TSC update pulse is sent.

Figure 3:
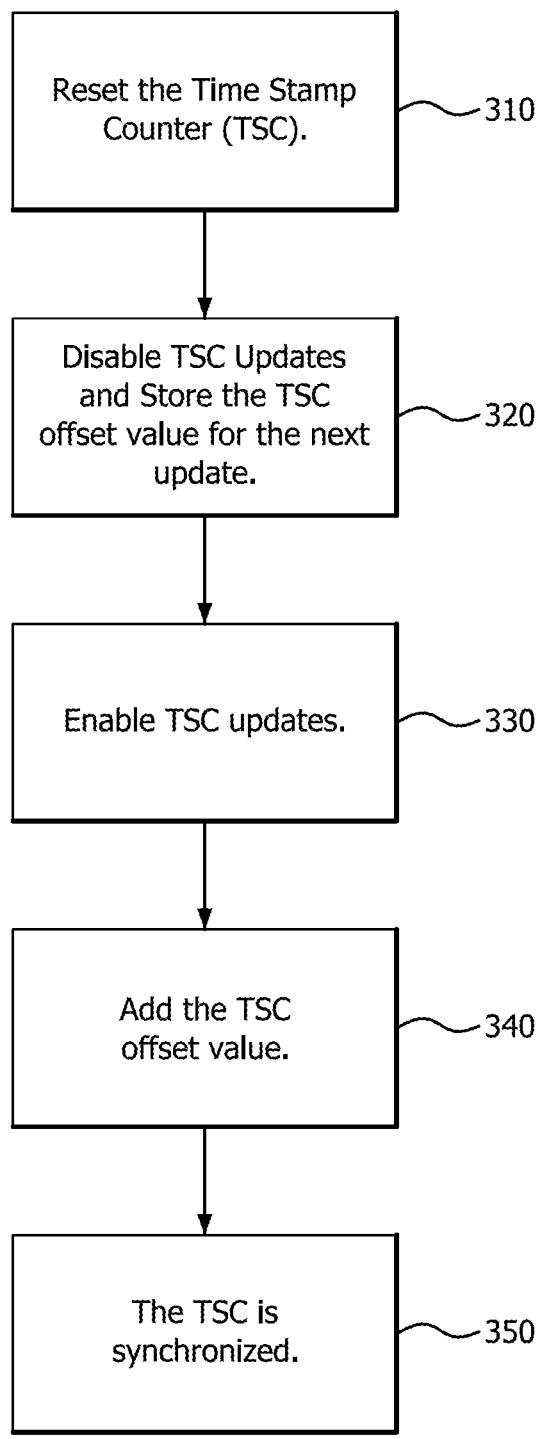
FIG. 3 is a flow diagram of an example method of synchronizing the time stamp counter.

FIG. 3 is a flow diagram of an example method 300 of synchronizing the time stamp counter, such as the TSCs 123.

In step 310, the TSC is reset (initialized). At this point, TSC updates are disabled and the TSC offset value is stored for the next TSC update (step 320). Accordingly, during a power management event, the TSC 123 associated with a core 122 is in a condition to be synchronized upon power up.

Once a powerup cycle begins, TSC updates are enabled once again for the TSC 123 (step 330). At this point, the stored offset value is added to the counter (step 340), synchronizing the TSC 123 (step 350).

In order to perform method 300 above, there is a hierarchy of TSC counters that perform this sequence. At the topmost level, there is one master TSC counter ($TSC_T$) that is always on and always increments with the TSC clock (not shown). The next level down (e.g., a die level TSC on processor die 102—TSC $123_0$) synchronizes with the master $TSC_T$ to get a reference per die. From there, each TSC 123 associated with a core 122 synchronizes with the die-level TSC to get its TSC offset from the die-level counter. Accordingly, each branch of the tree (e.g., cores 122) can be powered down separately and the method is repeated as necessary to bring all the TSCs on that branch back into synchronization starting with the highest TSC and proceeding downward.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for synchronizing a time stamp counter (TSC) associated with a first processor core in a computer system, comprising:

initializing a first TSC associated with the first processor core by synchronizing the first TSC associated with the first processor core with at least a second TSC, associated with a second processor core, in a hierarchy of TSCs, wherein the hierarchy of TSCs includes a die-level TSC coupled to at least the second TSC and a master TSC coupled to the die-level TSC;

powering down one or more processor cores including the first processor core; and upon powering up of the one or more processor cores including the first processor core, synchronizing the first TSC associated with the first processor core with at least the second TSC in the hierarchy of TSCs.

2. The method of claim 1, further comprising disabling updates to the first TSC upon powering down the first processor core.

3. The method of claim 2, further comprising storing a TSC offset value upon powering down the first processor core.

4. The method of claim 3, further comprising enabling updates to the first TSC upon powering up the first processor core.

5. The method of claim 4, further comprising adding the TSC offset value to the TSC associated with the first processor core to synchronize the first TSC with at least the second TSC in the hierarchy of TSCs upon powering up the first processor core.

6. The method of claim 5, further comprising delaying updates to the first TSC until the TSC offset value is added.

7. The method of claim 1, wherein at least the second TSC in the hierarchy of TSCs is the die-level TSC, in communication with a plurality of TSCs each associated with a plurality of processor cores.

8. The method of claim 7, wherein the die-level TSC is in communication with the master TSC that is always powered on.

9. The method of claim 8, wherein the die-level TSC receives a TSC offset value from the master TSC and communicates the TSC offset value to the TSCs associated with the plurality of processor cores.

10. The method of claim 1, wherein the die-level TSC is in synchronization with the master TSC and at least the second TSC is in synchronization with the die-level TSC.

11. An apparatus for synchronizing Time Stamp Counters (TSCs) in a computer system, comprising:
   a processor die including a plurality of processor cores;
   a first TSC associated with a first processor core of the plurality of processor cores; and
   a second TSC, associated with a second processor core, in a hierarchy of TSCs, that is in communication with the first TSC, wherein the hierarchy of TSCs includes a die-level TSC coupled to the second TSC and a master TSC coupled to the die-level TSC,
   wherein the first TSC is initialized by synchronizing the first TSC with the second TSC;
   upon powering up of one or more processor cores, including the first processor core, after a powerdown, synchronizing the first TSC associated with the first processor core with the second TSC in the hierarchy of TSCs.

12. The apparatus of claim 11, wherein updates to the first TSC associated with the first processor core are disabled upon powering down.

13. The apparatus of claim 12, wherein a TSC offset value is stored upon powering down the first processor core.

14. The apparatus of claim 13, wherein updates to the TSC associated with the first processor core are enabled upon powering up.

15. The apparatus of claim 14, wherein the TSC offset value is added to the TSC associated with the first processor core to synchronize the TSC associated with the first processor core with at least one other TSC in the hierarchy of TSCs upon powering up.

16. The apparatus of claim 15, wherein updates to the TSC associated with the first processor core are delayed until the TSC offset value is added.

17. The apparatus of claim 16, wherein the second TSC in the hierarchy of TSCs is the die-level TSC, in communication with the first TSC and a plurality of TSCs each associated with the plurality of processor cores.

18. The apparatus of claim 17, wherein the master TSC is in communication with the die-level TSC.

19. The apparatus of claim 18, wherein the master TSC is always in a powered on state.

20. The apparatus of claim 19, wherein the die-level TSC receives the TSC offset value from the master TSC and communicates the TSC offset value to the first TSC and the TSCs associated with the plurality of processor cores.

21. A non-transitory computer-readable medium for synchronizing a Time Stamp Counter (TSC) associated with a first processor core in a computer system, the non-transitory computer-readable medium having instructions recorded thereon, that when executed by a processor, cause the processor to perform operations including:
   initializing a first TSC associated with the first processor core by synchronizing the first TSC associated with the first processor core with at least a second TSC, associated with a second processor core, in a hierarchy of TSCs,
   wherein the hierarchy of TSCs includes a die-level TSC coupled to at least the second TSC and a master TSC coupled to the die-level TSC;
   powering down one or more processor cores including the first processor core; and
   upon powering up of the one or more processor cores including the first processor core, synchronizing the first TSC associated with the first processor core with at least the second TSC in the hierarchy of TSCs.

* * * * *